(12) United States Patent
Blossom

(10) Patent No.: US 7,591,416 B2
(45) Date of Patent: Sep. 22, 2009

(54) SELECTABLE MULTI-PURPOSE CARD

(75) Inventor: George Blossom, West Chester, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 277 days.

(21) Appl. No.: 11/276,348

(22) Filed: Feb. 24, 2006

(65) Prior Publication Data

US 2006/0131396 A1  Jun. 22, 2006

Related U.S. Application Data

(60) Continuation of application No. 11/011,683, filed on Dec. 15, 2004, now Pat. No. 7,191,952, which is a division of application No. 10/436,466, filed on May 13, 2003, now Pat. No. 7,163,153, which is a division of application No. 09/730,399, filed on Dec. 6, 2000, now Pat. No. 6,631,849.

(51) Int. Cl.
*G06K 5/10* (2006.01)
(52) U.S. Cl. ........................... 235/380; 235/382
(58) Field of Classification Search ........... 235/380, 235/379, 382, 487, 492
See application file for complete search history.

(56) References Cited

U.S. PATENT DOCUMENTS

| | | | |
|---|---|---|---|
| 3,634,669 A | 1/1972 | Soumas et al. | |
| 3,713,235 A | 1/1973 | Roberts | |
| 3,946,206 A | 3/1976 | Darjany | |
| 4,047,033 A | 9/1977 | Malmberg et al. | |
| 4,058,220 A | 11/1977 | Torongo | |
| D248,203 S | 6/1978 | Morse | |
| 4,130,881 A | 12/1978 | Haessler et al. | |
| 4,465,206 A | 8/1984 | Sorel et al. | |
| 4,545,838 A | 10/1985 | Minkus et al. | |

(Continued)

FOREIGN PATENT DOCUMENTS

CA 2293321 6/1998

(Continued)

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

(Continued)

*Primary Examiner*—Daniel St.Cyr
(74) *Attorney, Agent, or Firm*—Hunton & Williams, LLP

(57) ABSTRACT

A selectable, multi-purpose card comprising a plurality of features stored in memory means operatively mounted on the card and selection means for allowing a user to select a feature in a few simple steps, preferably in a single step. In one embodiment the card includes a plurality of magnetic strips positioned on the card in a manner to allow swiping each magnetic strip separately using conventional reading devices. Each magnetic strip activates a different feature of the card. In another embodiment the card includes a programmable magnetic strip, a plurality of features stored in memory means mounted on the card, a plurality of buttons or contacts, and means for programming the magnetic strip with a different card feature. The card may also include a thin, flexible display.

30 Claims, 4 Drawing Sheets

U.S. PATENT DOCUMENTS

| | | |
|---|---|---|
| 4,582,985 A | 4/1986 | Lofberg |
| 4,614,861 A | 9/1986 | Pavlov et al. |
| 4,634,845 A | 1/1987 | Hale et al. |
| 4,643,452 A | 2/1987 | Chang et al. |
| 4,689,478 A | 8/1987 | Hale et al. |
| 4,700,055 A | 10/1987 | Kashkashian, Jr. |
| 4,746,787 A | 5/1988 | Okada et al. |
| 4,750,119 A | 6/1988 | Robertson et al. |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |
| 4,831,242 A | 5/1989 | Englehardt |
| 4,831,526 A | 5/1989 | Luchs |
| 4,837,422 A | 6/1989 | Dethloff et al. |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,978,401 A | 12/1990 | Bonomi |
| 4,992,940 A | 2/1991 | Dworkin |
| 5,025,372 A | 6/1991 | Burton et al. |
| 5,049,728 A | 9/1991 | Rovin |
| 5,055,662 A | 10/1991 | Hasegawa |
| 5,080,748 A | 1/1992 | Bonomi |
| 5,095,194 A | 3/1992 | Barbanell |
| 5,117,355 A | 5/1992 | McCarthy |
| 5,146,068 A | 9/1992 | Ugawa et al. |
| 5,175,416 A | 12/1992 | Mansvelt |
| 5,177,342 A | 1/1993 | Adams |
| 5,180,901 A | 1/1993 | Hiramatsu |
| 5,185,697 A | 2/1993 | Jacobs et al. |
| 5,191,522 A | 3/1993 | Bosco et al. |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,214,700 A | 5/1993 | Pinkas et al. |
| 5,218,631 A | 6/1993 | Katz |
| 5,247,190 A | 9/1993 | Friend et al. |
| 5,276,311 A | 1/1994 | Hennige |
| 5,287,268 A | 2/1994 | McCarthy |
| 5,287,269 A | 2/1994 | Dorrough et al. |
| 5,297,026 A | 3/1994 | Hoffman |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,359,183 A | 10/1994 | Skodlar |
| 5,361,062 A | 11/1994 | Weiss et al. |
| 5,365,575 A | 11/1994 | Katz |
| 5,383,113 A | 1/1995 | Knight |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,424,524 A | 6/1995 | Ruppert et al. |
| 5,450,477 A | 9/1995 | Amarant et al. |
| 5,453,601 A | 9/1995 | Rosen |
| 5,455,407 A | 10/1995 | Rosen |
| 5,457,305 A | 10/1995 | Akel et al. |
| 5,459,306 A | 10/1995 | Stein et al. |
| 5,465,206 A | 11/1995 | Hilt et al. |
| 5,466,919 A | 11/1995 | Hovakimian |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,482,139 A | 1/1996 | Rivalto |
| 5,483,444 A | 1/1996 | Malark et al. |
| 5,483,445 A | 1/1996 | Pickering |
| 5,500,514 A | 3/1996 | Veeneman et al. |
| 5,503,891 A | 4/1996 | Marshall et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,537,314 A | 7/1996 | Kanter |
| 5,544,086 A | 8/1996 | Davis et al. |
| 5,544,246 A | 8/1996 | Mandelbaum et al. |
| 5,553,120 A | 9/1996 | Katz |
| 5,577,109 A | 11/1996 | Stimson et al. |
| 5,578,808 A | 11/1996 | Taylor |
| 5,581,064 A | 12/1996 | Riley et al. |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,619,558 A | 4/1997 | Jheeta |
| 5,621,787 A | 4/1997 | McKoy et al. |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Stone et al. |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle et al. |
| 5,653,914 A | 8/1997 | Holmes et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,675,662 A | 10/1997 | Deaton et al. |
| 5,677,955 A | 10/1997 | Doggett et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,699,528 A | 12/1997 | Hogan |
| 5,703,344 A | 12/1997 | Bezy et al. |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,886 A | 1/1998 | Christensen et al. |
| 5,710,887 A | 1/1998 | Chelliah et al. |

| | | | | | |
|---|---|---|---|---|---|
| 5,710,889 A | 1/1998 | Clark et al. | 5,887,065 A | 3/1999 | Audebert |
| 5,715,399 A | 2/1998 | Bezos | 5,890,138 A | 3/1999 | Godin et al. |
| 5,717,925 A | 2/1998 | Harper et al. | 5,890,140 A | 3/1999 | Clark et al. |
| 5,721,768 A | 2/1998 | Stimson et al. | H1794 H | 4/1999 | Claus |
| 5,721,781 A | 2/1998 | Deo et al. | H001794 H | 4/1999 | Claus |
| 5,726,884 A | 3/1998 | Sturgeon et al. | 5,897,620 A | 4/1999 | Walker et al. |
| 5,727,153 A | 3/1998 | Powell | 5,897,621 A | 4/1999 | Boesch et al. |
| 5,728,998 A | 3/1998 | Novis et al. | 5,905,246 A | 5/1999 | Fajkowski |
| 5,729,693 A | 3/1998 | Holda-Fleck | 5,907,350 A | 5/1999 | Nemirofsky |
| 5,734,154 A | 3/1998 | Jachimowicz et al. | 5,911,135 A | 6/1999 | Atkins |
| 5,734,838 A | 3/1998 | Robinson | 5,911,136 A | 6/1999 | Atkins |
| 5,736,728 A | 4/1998 | Matsubara | 5,914,472 A | 6/1999 | Foladare et al. |
| 5,737,421 A | 4/1998 | Audebert | 5,920,629 A | 7/1999 | Rosen |
| 5,740,549 A | 4/1998 | Reilly et al. | 5,920,844 A | 7/1999 | Hotta et al. |
| 5,742,775 A | 4/1998 | King | 5,920,847 A | 7/1999 | Kolling et al. |
| 5,745,049 A | 4/1998 | Akiyama et al. | 5,923,734 A | 7/1999 | Taskett |
| 5,745,706 A | 4/1998 | Wolfberg et al. | 5,926,800 A | 7/1999 | Baronowski et al. |
| 5,749,075 A | 5/1998 | Toader et al. | 5,930,217 A | 7/1999 | Kayanuma |
| 5,760,381 A | 6/1998 | Stich et al. | 5,931,764 A | 8/1999 | Freeman et al. |
| 5,765,138 A | 6/1998 | Aycock et al. | 5,933,817 A | 8/1999 | Hucal |
| 5,765,141 A | 6/1998 | Spector | 5,937,068 A | 8/1999 | Audebert |
| 5,770,843 A | 6/1998 | Rose et al. | 5,940,811 A | 8/1999 | Norris |
| 5,770,849 A | 6/1998 | Novis et al. | 5,946,669 A | 8/1999 | Polk |
| 5,774,870 A | 6/1998 | Storey | 5,952,641 A | 9/1999 | Korshun |
| 5,777,305 A | 7/1998 | Smith et al. | 5,953,423 A | 9/1999 | Rosen |
| 5,777,306 A | 7/1998 | Masuda | 5,953,710 A | 9/1999 | Fleming |
| 5,777,903 A | 7/1998 | Piosenka et al. | 5,955,961 A | 9/1999 | Wallerstein |
| 5,778,067 A | 7/1998 | Jones et al. | 5,956,695 A | 9/1999 | Carrithers et al. |
| 5,787,156 A | 7/1998 | Katz | 5,963,648 A | 10/1999 | Rosen |
| 5,787,404 A | 7/1998 | Fernandez-Holman | 5,970,479 A | 10/1999 | Shepherd |
| 5,789,733 A | 8/1998 | Jachimowicz et al. | 5,970,480 A | 10/1999 | Kalina |
| 5,790,636 A | 8/1998 | Marshall | 5,974,399 A | 10/1999 | Giuliani et al. |
| 5,794,207 A | 8/1998 | Walker | RE36,365 E | 11/1999 | Levine et al. |
| 5,798,950 A | 8/1998 | Fitzgerald | 5,984,180 A | 11/1999 | Albrecht |
| 5,799,087 A | 8/1998 | Rosen | 5,984,191 A | 11/1999 | Chapin, Jr. |
| 5,802,176 A | 9/1998 | Audebert | 5,987,434 A | 11/1999 | Libman |
| 5,805,719 A | 9/1998 | Pare et al. | 5,988,509 A | 11/1999 | Taskett |
| 5,806,042 A | 9/1998 | Kelly et al. | 5,991,413 A | 11/1999 | Arditti et al. |
| 5,806,044 A | 9/1998 | Powell | 5,991,743 A | 11/1999 | Irving et al. |
| 5,806,045 A | 9/1998 | Biorge | 5,991,748 A | 11/1999 | Taskett |
| 5,807,627 A | 9/1998 | Friend et al. | 5,991,750 A | 11/1999 | Watson |
| 5,809,478 A | 9/1998 | Greco | 5,999,596 A | 12/1999 | Walker et al. |
| 5,814,796 A * | 9/1998 | Benson et al. ............... 235/375 | 6,000,608 A | 12/1999 | Dorf |
| 5,815,657 A | 9/1998 | Williams et al. | 6,000,832 A | 12/1999 | Franklin et al. |
| 5,815,658 A | 9/1998 | Kuriyama | 6,002,383 A | 12/1999 | Shimada |
| 5,819,234 A | 10/1998 | Slavin et al. | 6,003,762 A | 12/1999 | Hayashida |
| 5,819,237 A | 10/1998 | Garman | 6,004,681 A | 12/1999 | Epstein et al. |
| 5,826,243 A | 10/1998 | Musmanno et al. | 6,006,988 A | 12/1999 | Behrmann et al. |
| 5,832,457 A | 11/1998 | O'Brien | 6,009,415 A | 12/1999 | Shurling et al. |
| 5,832,488 A | 11/1998 | Eberhardt | 6,014,636 A | 1/2000 | Reeder |
| 5,835,061 A | 11/1998 | Stewart | 6,014,638 A | 1/2000 | Burge et al. |
| 5,835,576 A | 11/1998 | Katz | 6,014,645 A | 1/2000 | Cunningham |
| 5,839,113 A | 11/1998 | Federau et al. | 6,014,749 A | 1/2000 | Gloor et al. |
| 5,845,259 A | 12/1998 | West et al. | 6,016,482 A | 1/2000 | Molinari et al. |
| 5,845,260 A | 12/1998 | Nakano et al. | 6,016,954 A | 1/2000 | Abe et al. |
| 5,852,811 A | 12/1998 | Atkins | 6,019,284 A | 2/2000 | Freeman et al. |
| 5,852,812 A | 12/1998 | Reeder | 6,021,189 A | 2/2000 | Vu |
| 5,857,079 A | 1/1999 | Claus et al. | 6,026,370 A | 2/2000 | Jermyn |
| 5,857,175 A | 1/1999 | Day | 6,029,139 A | 2/2000 | Cunningham et al. |
| 5,857,709 A | 1/1999 | Chock | 6,029,144 A | 2/2000 | Barrett et al. |
| 5,859,419 A | 1/1999 | Wynn | 6,029,890 A | 2/2000 | Austin |
| 5,864,609 A | 1/1999 | Cross et al. | 6,032,136 A | 2/2000 | Brake, Jr. et al. |
| 5,864,828 A | 1/1999 | Atkins | 6,032,859 A | 3/2000 | Muehlberger et al. |
| 5,864,830 A | 1/1999 | Armetta et al. | 6,036,099 A | 3/2000 | Leighton |
| RE36,116 E | 2/1999 | McCarthy | 6,038,292 A | 3/2000 | Thomas |
| 5,870,718 A | 2/1999 | Spector | 6,038,552 A | 3/2000 | Fleischl et al. |
| 5,870,721 A | 2/1999 | Norris | 6,041,315 A | 3/2000 | Pollin |
| 5,875,437 A | 2/1999 | Atkins | 6,044,360 A | 3/2000 | Picciallo |
| 5,883,377 A | 3/1999 | Chapin, Jr. | 6,045,042 A | 4/2000 | Ohno |
| 5,883,810 A | 3/1999 | Franklin et al. | 6,047,067 A | 4/2000 | Rosen |
| 5,884,271 A | 3/1999 | Pitroda | 6,047,268 A | 4/2000 | Bartoli et al. |
| 5,884,278 A | 3/1999 | Powell | 6,049,463 A | 4/2000 | O'Malley et al. |
| 5,884,285 A | 3/1999 | Atkins | 6,049,773 A | 4/2000 | McCormack et al. |

| | | | |
|---|---|---|---|
| 6,049,782 A | 4/2000 | Gottesman et al. | |
| 6,058,378 A | 5/2000 | Clark et al. | |
| 6,064,985 A | 5/2000 | Anderson | |
| 6,065,675 A | 5/2000 | Teicher | |
| 6,068,183 A | 5/2000 | Freeman et al. | |
| 6,070,067 A | 5/2000 | Nguyen et al. | |
| 6,070,147 A | 5/2000 | Harms et al. | |
| 6,070,153 A | 5/2000 | Simpson | |
| 6,076,068 A | 6/2000 | DeLapa et al. | |
| 6,076,072 A | 6/2000 | Libman | |
| 6,078,888 A | 6/2000 | Johnson, Jr. | |
| 6,078,891 A | 6/2000 | Riordan et al. | |
| 6,091,817 A | 7/2000 | Bertina et al. | |
| 6,092,056 A | 7/2000 | Tull, Jr. et al. | |
| 6,095,412 A | 8/2000 | Bertina et al. | |
| 6,095,416 A | 8/2000 | Grant et al. | |
| 6,098,053 A | 8/2000 | Slater | |
| 6,105,011 A | 8/2000 | Morrison, Jr. | |
| 6,105,865 A | 8/2000 | Hardesty | |
| 6,109,525 A | 8/2000 | Blomqvist et al. | |
| 6,112,191 A | 8/2000 | Burke | |
| 6,115,458 A | 9/2000 | Taskett | |
| 6,119,097 A | 9/2000 | Ibarra | |
| 6,119,103 A | 9/2000 | Basch et al. | |
| 6,119,107 A | 9/2000 | Polk | |
| 6,119,932 A | 9/2000 | Maloney et al. | |
| 6,122,623 A | 9/2000 | Garman | |
| 6,128,598 A | 10/2000 | Walker et al. | |
| 6,128,599 A | 10/2000 | Walker et al. | |
| 6,129,274 A | 10/2000 | Suzuki | |
| 6,129,572 A * | 10/2000 | Feldman et al. | 439/328 |
| 6,134,309 A | 10/2000 | Carson | |
| 6,134,536 A | 10/2000 | Shepherd | |
| 6,138,917 A | 10/2000 | Chapin, Jr. | |
| 6,145,741 A | 11/2000 | Wisdom et al. | |
| 6,148,297 A | 11/2000 | Swor et al. | |
| 6,161,096 A | 12/2000 | Bell | |
| 6,163,770 A | 12/2000 | Gamble et al. | |
| 6,164,533 A | 12/2000 | Barton | |
| 6,167,385 A | 12/2000 | Hartley-Urquhart | |
| 6,169,975 B1 | 1/2001 | White et al. | |
| 6,173,267 B1 | 1/2001 | Cairns | |
| 6,182,048 B1 | 1/2001 | Osborn et al. | |
| 6,182,894 B1 | 2/2001 | Hackett et al. | |
| 6,186,793 B1 | 2/2001 | Brubaker | |
| 6,189,787 B1 | 2/2001 | Dorf | |
| 6,192,113 B1 | 2/2001 | Lorsch | |
| 6,195,644 B1 | 2/2001 | Bowie | |
| 6,202,053 B1 | 3/2001 | Christiansen et al. | |
| RE37,122 E | 4/2001 | Levine et al. | |
| 6,213,392 B1 * | 4/2001 | Zuppicich | 235/380 |
| 6,223,143 B1 | 4/2001 | Weinstock et al. | |
| 6,227,447 B1 | 5/2001 | Campisano | |
| 6,243,688 B1 | 6/2001 | Kalina | |
| 6,260,758 B1 | 7/2001 | Blumberg | |
| 6,263,316 B1 | 7/2001 | Khan et al. | |
| 6,265,977 B1 | 7/2001 | Vega et al. | |
| 6,278,981 B1 | 8/2001 | Dembo et al. | |
| 6,295,344 B1 | 9/2001 | Marshall | |
| 6,295,522 B1 | 9/2001 | Boesch | |
| 6,298,336 B1 | 10/2001 | Davis et al. | |
| 6,308,268 B1 | 10/2001 | Audebert | |
| 6,324,524 B1 | 11/2001 | Lent et al. | |
| 6,330,546 B1 | 12/2001 | Gopinathan et al. | |
| 6,336,099 B1 | 1/2002 | Barnett et al. | |
| 6,338,048 B1 | 1/2002 | Mori | |
| 6,341,724 B2 | 1/2002 | Campisano | |
| 6,343,743 B1 | 2/2002 | Lamla | |
| 6,345,261 B1 | 2/2002 | Feidelson | |
| 6,345,766 B1 | 2/2002 | Taskett et al. | |
| 6,349,291 B1 | 2/2002 | Varma | |
| 6,360,954 B1 * | 3/2002 | Barnardo | 235/492 |
| 6,366,220 B1 | 4/2002 | Elliott | |
| 6,373,969 B1 | 4/2002 | Adler | |
| 6,374,230 B1 | 4/2002 | Walker et al. | |
| 6,377,669 B1 | 4/2002 | Walker et al. | |
| 6,385,591 B1 | 5/2002 | Mankoff | |
| 6,385,594 B1 | 5/2002 | Lebda et al. | |
| 6,386,444 B1 | 5/2002 | Sullivan | |
| 6,397,202 B1 | 5/2002 | Higgins et al. | |
| 6,402,039 B1 | 6/2002 | Freeman et al. | |
| 6,405,182 B1 | 6/2002 | Cuervo | |
| 6,422,459 B1 | 7/2002 | Kawan | |
| 6,422,462 B1 | 7/2002 | Cohen | |
| 6,424,029 B1 | 7/2002 | Giesler | |
| 6,429,927 B1 | 8/2002 | Borza | |
| 6,434,259 B1 | 8/2002 | Hamid et al. | |
| D462,477 S | 9/2002 | Osborne | |
| 6,446,210 B1 | 9/2002 | Borza | |
| 6,450,407 B1 | 9/2002 | Freeman et al. | |
| 6,463,039 B1 | 10/2002 | Ricci et al. | |
| 6,467,684 B2 | 10/2002 | Fite et al. | |
| 6,473,500 B1 | 10/2002 | Risafi et al. | |
| 6,481,125 B1 | 11/2002 | Pokrasoff | |
| 6,484,144 B2 | 11/2002 | Martin et al. | |
| 6,484,148 B1 | 11/2002 | Boyd | |
| 6,484,428 B1 | 11/2002 | Greenwald et al. | |
| D466,929 S | 12/2002 | Haas | |
| D467,271 S | 12/2002 | Haas | |
| D467,272 S | 12/2002 | Haas | |
| 6,498,861 B1 | 12/2002 | Hamid et al. | |
| D468,789 S | 1/2003 | Arnold et al. | |
| 6,505,095 B1 * | 1/2003 | Kolls | 700/244 |
| 6,505,168 B1 | 1/2003 | Rothman et al. | |
| 6,505,780 B1 | 1/2003 | Yassin et al. | |
| 6,529,880 B1 | 3/2003 | McKeen et al. | |
| D474,235 S | 5/2003 | Haas | |
| 6,557,750 B1 | 5/2003 | Druse et al. | |
| 6,557,766 B1 * | 5/2003 | Leighton | 235/488 |
| 6,560,578 B2 | 5/2003 | Eldering | |
| 6,561,657 B1 | 5/2003 | Schofield | |
| 6,567,786 B1 | 5/2003 | Bibelnieks et al. | |
| 6,567,821 B1 | 5/2003 | Polk | |
| 6,574,603 B1 | 6/2003 | Dickson et al. | |
| 6,581,839 B1 | 6/2003 | Lasch et al. | |
| D476,681 S | 7/2003 | Al Amri | |
| D476,683 S | 7/2003 | Kilburn | |
| D477,359 S | 7/2003 | Haas | |
| 6,601,040 B1 | 7/2003 | Kolls | |
| 6,601,761 B1 | 8/2003 | Katis | |
| 6,609,111 B1 | 8/2003 | Bell | |
| RE38,255 E | 9/2003 | Levine et al. | |
| 6,615,189 B1 | 9/2003 | Phillips et al. | |
| 6,615,190 B1 | 9/2003 | Slater | |
| 6,625,582 B2 | 9/2003 | Richman et al. | |
| 6,631,849 B2 | 10/2003 | Blossom | |
| 6,641,049 B2 | 11/2003 | Luu | |
| 6,641,050 B2 | 11/2003 | Kelley et al. | |
| 6,671,673 B1 | 12/2003 | Baseman et al. | |
| D485,573 S | 1/2004 | Li | |
| 6,675,127 B2 | 1/2004 | LaBlanc et al. | |
| 6,675,149 B1 | 1/2004 | Ruffin et al. | |
| 6,687,222 B1 | 2/2004 | Albert et al. | |
| 6,693,544 B1 | 2/2004 | Hebbecker | |
| 6,732,919 B2 | 5/2004 | Macklin et al. | |
| 6,742,704 B2 | 6/2004 | Fitzmaurice et al. | |
| 6,745,938 B2 | 6/2004 | Sullivan | |
| 6,757,660 B2 | 6/2004 | Canada et al. | |
| 6,757,710 B2 | 6/2004 | Reed | |
| D495,736 S | 9/2004 | Scharf | |
| 6,793,135 B1 | 9/2004 | Ryoo | |
| 6,802,008 B1 | 10/2004 | Ikefuji et al. | |
| 6,805,287 B2 | 10/2004 | Bishop | |
| 6,856,973 B1 | 2/2005 | Bott | |
| 6,857,566 B2 | 2/2005 | Wankmueller | |
| 6,865,547 B1 | 3/2005 | Brake, Jr. et al. | |

| | | |
|---|---|---|
| 6,868,426 B1 | 3/2005 | Mankoff |
| 6,876,971 B1 | 4/2005 | Burke |
| D505,450 S | 5/2005 | Lauer et al. |
| 6,895,383 B2 | 5/2005 | Heinrich |
| 6,895,386 B1 | 5/2005 | Bachman et al. |
| 6,901,372 B1 | 5/2005 | Helzerman |
| 6,912,502 B1 | 6/2005 | Buddle et al. |
| 6,970,830 B1 | 11/2005 | Samra et al. |
| 6,978,369 B2 | 12/2005 | Wheeler et al. |
| 6,999,943 B1 | 2/2006 | Johnson et al. |
| 7,006,992 B1 | 2/2006 | Packwood |
| 7,051,925 B2 | 5/2006 | Schwarz, Jr. |
| 7,072,864 B2 | 7/2006 | Brake, Jr. et al. |
| 7,072,909 B2 | 7/2006 | Polk |
| 7,089,503 B1 | 8/2006 | Bloomquist et al. |
| 7,092,905 B2 | 8/2006 | Behrenbrinker et al. |
| 7,092,916 B2 | 8/2006 | Diveley |
| 7,104,443 B1 | 9/2006 | Paul et al. |
| 7,107,249 B2 | 9/2006 | Dively |
| 7,113,914 B1 | 9/2006 | Spielmann et al. |
| D533,220 S | 12/2006 | Graves et al. |
| 7,165,049 B2 | 1/2007 | Slater |
| D538,349 S | 3/2007 | Hollands |
| 7,216,091 B1 | 5/2007 | Blandina et al. |
| 7,225,155 B1 | 5/2007 | Polk |
| 7,243,839 B2 | 7/2007 | Beck et al. |
| 7,249,092 B2 | 7/2007 | Dunn et al. |
| 7,252,223 B2 | 8/2007 | Schofield |
| 7,263,507 B1 | 8/2007 | Brake et al. |
| D551,705 S | 9/2007 | Mershon |
| 7,295,999 B1 | 11/2007 | Simon et al. |
| 7,315,843 B2 | 1/2008 | Diveley et al. |
| 7,346,567 B2 | 3/2008 | Weeks |
| 7,392,222 B1 | 6/2008 | Hamilton et al. |
| 7,392,224 B1 | 6/2008 | Bauer et al. |
| 2001/0011227 A1 | 8/2001 | Ashery et al. |
| 2001/0011243 A1 | 8/2001 | Dembo et al. |
| 2001/0027389 A1 | 10/2001 | Beverina et al. |
| 2001/0027441 A1 | 10/2001 | Wankmueller |
| 2001/0034647 A1 | 10/2001 | Marks et al. |
| 2001/0034682 A1 | 10/2001 | Knight et al. |
| 2001/0037315 A1 | 11/2001 | Saliba et al. |
| 2001/0044293 A1 | 11/2001 | Morgan |
| 2001/0047332 A1 | 11/2001 | Gonen-Friedman et al. |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0019793 A1 | 2/2002 | Frattalone |
| 2002/0019803 A1 | 2/2002 | Muller |
| 2002/0026418 A1 | 2/2002 | Koppel et al. |
| 2002/0032609 A1 | 3/2002 | Wilkman |
| 2002/0046089 A1 | 4/2002 | Zorn |
| 2002/0046255 A1 | 4/2002 | Moore et al. |
| 2002/0062235 A1 | 5/2002 | Wahlbin et al. |
| 2002/0065720 A1 | 5/2002 | Carswell et al. |
| 2002/0077964 A1 | 6/2002 | Brody et al. |
| 2002/0077978 A1 | 6/2002 | O'Leary et al. |
| 2002/0082990 A1 | 6/2002 | Jones |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0099586 A1 | 7/2002 | Bladen et al. |
| 2002/0104878 A1 | 8/2002 | Seifert et al. |
| 2002/0111916 A1 | 8/2002 | Coronna et al. |
| 2002/0116271 A1 | 8/2002 | Mankoff |
| 2002/0116330 A1 | 8/2002 | Hed et al. |
| 2002/0120627 A1 | 8/2002 | Mankoff |
| 2002/0120642 A1 | 8/2002 | Fetherston |
| 2002/0129221 A1 | 9/2002 | Borgin et al. |
| 2002/0138418 A1 | 9/2002 | Zarin et al. |
| 2002/0143703 A1 | 10/2002 | Razvan et al. |
| 2002/0147662 A1 | 10/2002 | Anderson |
| 2002/0156723 A1 | 10/2002 | Lilly et al. |
| 2002/0165771 A1 | 11/2002 | Walker et al. |
| 2002/0165820 A1 | 11/2002 | Anvekar et al. |
| 2002/0169719 A1 | 11/2002 | Dively et al. |
| 2002/0174016 A1 | 11/2002 | Cuervo |
| 2002/0174018 A1 | 11/2002 | Bunger et al. |
| 2002/0178025 A1 | 11/2002 | Hansen et al. |
| 2002/0194081 A1 | 12/2002 | Perkowski |
| 2003/0004828 A1 | 1/2003 | Epstein |
| 2003/0018613 A1 | 1/2003 | Oytac |
| 2003/0023549 A1 | 1/2003 | Armes et al. |
| 2003/0028518 A1 | 2/2003 | Mankoff |
| 2003/0033211 A1 | 2/2003 | Haines et al. |
| 2003/0033246 A1 | 2/2003 | Slater |
| 2003/0046249 A1 | 3/2003 | Wu |
| 2003/0053609 A1 | 3/2003 | Risafi et al. |
| 2003/0074290 A1 | 4/2003 | Clore |
| 2003/0101119 A1 | 5/2003 | Persons et al. |
| 2003/0105672 A1 | 6/2003 | Epstein et al. |
| 2003/0110111 A1 | 6/2003 | Nalebuff et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0154125 A1 | 8/2003 | Mittal et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0204421 A1 | 10/2003 | Houle et al. |
| 2003/0216965 A1 | 11/2003 | Libman |
| 2003/0225623 A1 | 12/2003 | Wankmueller |
| 2003/0229525 A1 | 12/2003 | Callahan et al. |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0059952 A1 | 3/2004 | Newport et al. |
| 2004/0064402 A1 | 4/2004 | Dreyer et al. |
| 2004/0093296 A1 | 5/2004 | Phelan et al. |
| 2004/0093303 A1 | 5/2004 | Picciallo |
| 2004/0098351 A1 | 5/2004 | Duke |
| 2004/0103431 A1 | 5/2004 | Davenport et al. |
| 2004/0118914 A1 | 6/2004 | Smith et al. |
| 2004/0128186 A1 | 7/2004 | Breslin et al. |
| 2004/0193539 A1 | 9/2004 | Sullivan |
| 2004/0215507 A1 | 10/2004 | Levitt et al. |
| 2004/0243498 A1 | 12/2004 | Duke |
| 2005/0021353 A1 | 1/2005 | Aviles et al. |
| 2005/0021400 A1 | 1/2005 | Postrel |
| 2005/0021457 A1 | 1/2005 | Johnson et al. |
| 2005/0027649 A1 | 2/2005 | Cech |
| 2005/0035192 A1 | 2/2005 | Bonalle et al. |
| 2005/0071230 A1 | 3/2005 | Mankoff |
| 2005/0075932 A1 | 4/2005 | Mankoff |
| 2005/0077350 A1 | 4/2005 | Courtion et al. |
| 2005/0086167 A1 | 4/2005 | Brake et al. |
| 2005/0091138 A1 | 4/2005 | Awatsu |
| 2005/0102228 A1 | 5/2005 | Srinivasan |
| 2005/0108152 A1 | 5/2005 | Tsao Lee et al. |
| 2005/0119979 A1 | 6/2005 | Murashita et al. |
| 2005/0121512 A1 | 6/2005 | Wankmueller |
| 2005/0127164 A1 | 6/2005 | Wankmueler |
| 2005/0171898 A1 | 8/2005 | Bishop et al. |
| 2005/0171905 A1 | 8/2005 | Wankmueler |
| 2005/0199705 A1 | 9/2005 | Beck et al. |
| 2005/0234771 A1 | 10/2005 | Register et al. |
| 2005/0269396 A1 | 12/2005 | Schofield |
| 2006/0026092 A1 | 2/2006 | Klein et al. |
| 2006/0036553 A1 | 2/2006 | Gupta et al. |
| 2006/0047573 A1 | 3/2006 | Mitchell et al. |
| 2006/0047589 A1 | 3/2006 | Grau |
| 2006/0074794 A1 | 4/2006 | Nespola |
| 2006/0085334 A1 | 4/2006 | Murphy |

| | | | |
|---|---|---|---|
| 2006/0106696 | A1 | 5/2006 | Carlson et al. |
| 2006/0116903 | A1 | 6/2006 | Becerra |
| 2006/0122918 | A1 | 6/2006 | Graboske et al. |
| 2006/0131869 | A1 | 6/2006 | Brignull |
| 2006/0224480 | A1 | 10/2006 | Bent et al. |
| 2006/0242057 | A1 | 10/2006 | Velarde |
| 2006/0251478 | A1 | 11/2006 | Desmeules |
| 2008/0177659 | A1 | 7/2008 | Lacey et al. |

FOREIGN PATENT DOCUMENTS

| | | | |
|---|---|---|---|
| EP | 0843292 | A2 | 5/1998 |
| EP | 0855659 | | 7/1998 |
| EP | 959440 | | 11/1999 |
| GB | 2275654 | A | 9/1994 |
| GB | 2376787 | | 12/2002 |
| GB | 2377071 | | 12/2002 |
| GB | 2377314 | | 1/2003 |
| JP | 7152960 | | 6/1995 |
| JP | 2007088822 | A | 4/2007 |
| WO | WO 94/29112 | | 12/1994 |
| WO | WO 97/41673 | | 11/1997 |
| WO | WO 98/59307 | | 12/1998 |
| WO | WO 99/05633 | | 2/1999 |
| WO | WO 99/54841 | | 10/1999 |
| WO | WO 01/18699 | | 3/2001 |
| WO | WO 01/69347 | | 9/2001 |
| WO | WO 01/69347 | A2 | 9/2001 |
| WO | WO 01/69347 | A3 | 9/2001 |
| WO | WO 2005/043277 | A2 | 5/2005 |
| WO | WO 2005/043277 | A3 | 5/2005 |

OTHER PUBLICATIONS

Song, A Card That Asks For ID, Time Magazine, Apr. 12, 2004, 1 page.
A Store Card Issuer Looks for Lift from Electronic Gift Certificates, Credit Card News, Feb. 1, 1995, 2 pages.
Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard.net/companies/company-display, Apr. 6, 1999.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CESNaBANCO introduces stored value card technology blockbuster video Is first merchant partner.
CardEx Incentives, www.cardex.com, Apr. 6, 1999.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.

Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying By Credit Card-Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
First Data markets stored-value cards, Cards International, Jan. 30, 1996, p. 5.
First USA—Activate Today and Get One Hour Free Calling Cards Calls, Call 1-800-555-2535, First USA, 6 pages.
First USA—Call 1(800)335-2453 To Receive One Free Hour of Domestic Long Distance Calling (No Strings Attached), First USA, 6 pages.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Machlis, Have it the smart way: Burger King program drives smart-card use, Computerworld, printed Feb. 23, 2001, 1 page.
Here's the calling convenience you asked for: 1-800-call-ATT . . . For All Calls, AT&T, Appendix A: For Card Carriers, 1999, 7 pages.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
Konrad, IBM Had a Bunch of Unusual Ideas in 2003, www.philly.com, printed Jan. 21, 2004, posted on Jan. 13, 2004, 2 pages.
Incentive Firms Find Debit Cards A Rewarding Experience (Off-line debit card issuers converge efforts with companies looking for effective incentives to boost employee productivity and to motivate individuals to buy their products), Debit Card News, Vol.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.

Key Bank Holiday Offer, http://www.key.com/swiftgift/home.html, printed Apr. 5, 1999.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Clark, Microsoft, VISA to Jointly Develop PC Electronic-Shopping Software, The Wall Street Journal, Nov. 9, 1994, WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-CALL-ATT Campaign Promotes One Number for All Calls, AT&T Marketing, New Release, www.att.com/press/0297/970217.csa.htm, Feb. 17, 1997, 2 pages.
Schwab, Charles, Now 7 Ways For A better Total Return For Your Money; Schwat 1, The Inventor's Asset Management Account, Charles R. Schwab, Charles Schwab & Co., Inc., 16 pages.
Payment data, www.paymentdata.com, Mar. 5, 2004.
Dugas, Payroll May Ask: Paper or Plastic?, USA Today, 3B, Aug. 14, 2001, 1 page.
Proton world and Europay to co-operate in creation of new CEPS-compliant e-purse application, Press Release 1999, Waterloo, Belgium, Jun. 28, 1999, 2 pages.
Brown et al., Purchasing Card Magic: Eli Lilly Finds Accounts Payable Flying High With Plastic, Corporate Cashflow, vol. 15, No. 12, Nov. 1994, 2 pages.
Purse Application for Cross Border Use in Euro, Cordis, Pace 1st 1999-11531 Pace, www.cordis.lu, printed Feb. 23, 2001, 3 pages.
SK100 Smart Card Electronic Purse Balance Reader, SK100 Balance Reader, http://perso.wanadoo.fr, printed Feb. 23, 2001, 1 page.
Miller, Section E.2.1: Kerberos Authentication and Authorization System, Project Athena, Cambridge, MA, Dec. 21, 1987, 39 pages.
Souccar, Smart Cards: 1st Union Smart Card Pilot Enlists a Second Army Base, American Banker, Digital Frontiers, vol. 164, No. 61, Mar. 31, 1999, 3 pages.
Smart card for loyalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards: Costly Private Substitutions for Government Currency, Economic Quarterly, 1996, Economic Quarterly, v82, n3, p1(25), ISSN: 1069-7225, 17 pages.
Lzarony, Stuck for a gift? Give a prepaid credit card, www.bankrate.com, Dec. 21, 1998, 1 page.
Key, Swift Gift 'Wows' Internet Shoppers, PR Newswire, www.key.com/swiftgift/home.html, Dec. 2, 1998, 1 page.
The Campus Card Conundrum, Card Technology, Journal ISSN: 1093-1279, p. 25+, Feb. 1998, pp. 1-8.
The Electronic Purse Reaches the Car Park, http:\\docs.vircom.net/mobility/parking, printed Feb. 23, 2001, 2 pages.
The Evolution of a New Consumerism, Chain Store Age, vol. 73, Jun. 1997, pp. 8-9.
Stoughton, The Gift of Credit, www.washingtonpost.com/wp-srv/business, Dec. 14, 1998.
Stuber, The electronic purse: An overview of recent development and issues, Bank of Canada, Technical Report No. 74, www.bankofcanada.ca, Jan. 1996, printed Feb. 23, 2001, 2 pages.
Understanding the benefits: Smartcity offers a number of important benefits to both the card issuers and their customers, http://www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 pages.

Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International And SERMEPA Announce Plans For Cross Border Visa Cash Based On CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases visa cash electronic purse specifications based on CEPS, www.visa.com/av/news/PRaamisc042099.vhtml, San Francisco, Apr. 20, 1999.
Hansell, Visa to unveil electronic purse cards, New York Times, printed Feb. 23, 2001, 2 pages.
Welcome To Card Express CardEx, CardEx website archived by web.archive on Oct. 31, 1996, http://web.archive.org/web/*/http://www.cardex.com, retrieve Oct. 18, 2003, 7 pages.
Welcome To Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Swiftgift, Welcome to Swiftgift, Swiftgift, www.swiftgiftcard.com, Dec. 8, 1998, 10 pages.
Machlis et al., Will smart cards replace ATMS?, Computerworld, printed Feb. 23, 2001, 3 pages.
Claessens, et al., A Tangled World Wide Web of Security Issues, First Monday, retrieved from the internet at http://www.firstmonday.org/issues/issue7_3/claessens, retrieved from the internet on Oct. 6, 2006.
American Express Incentive Services, Incentive, Sep. 1996, p. 126.
Award Card Comparison, JA7922.
Card Based Award Systems, JA8309.
Nora Wood, Corporate Spotlight, Incentive, Dec. 1997, 4 pages.
Definition of Store-Value Card, Wikipedia, retrieved from the internet at http://en.wikipedia.org/wiki/Stored-value_card, retrieved from the internet on Apr. 16, 2007.
Eight Keys to Making the Right Choice, Incentive, Dec. 1996, 9 pages.
D. O'Mahony, Electronic Payment System, 1997, Artech House, XP002137255, p. 7-11.
Exclusively Yours From Maritz . . . The MasterCard Card Ultimate Incentive, Incentive, Oct. 1995, 3 pages.
Block, First Data Subsidiary Creates Payroll Card for the Bankless, LexisNexis Academic, Credit/Debit/ATMs, p. 10, Mar. 21, 1997.
Glossman, et al.,, Glossman, et al., Citicorp Company Report, Report No. 1647151, p. 8 of 16.
How Is It Different?, JA8331.
Incenticard, Bellsouth, JA8329.
Judy Quinn, Incentive Cards Explained, Incentive, Dec. 1995, 5 pages.
Vincent Alonzo, Incentive Marketing . . . Three If By Smart Card, Incentive Sep. 1995, p. 11.
Incentive gift Card: Another way to give the gift of choice!, Incentive, Aug. 1995, 2 pages.
LexisNexis Academic, Debit Card Innovation, vol. XXXV, No. 5, p. 2, May 1997.
LexisNexis Academic, Debit Cards: Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.
Maritz, Incentive, Jun. 1996, p. 111.
Meridian Award Cards, JA8251.
Meridian-the leader in card marketing, JA8343.
Meridicard vs. Debit Cards, JA7917.
Allen et al., Overview of Smart Cards and the Industry, Smart Cards: Seizing Strategic Business Opportunuties, Chapter 1, p. 2-20, Irwin Professional Publishing, 1997.
Paper or Plastic? With these three incentives, The Choice is Yours, Incentive, Feb. 1996, 2 pages.
Smart Cards: Big Brother's Little Helpers, The Privacy Committee of New South Wales, No. 66, Aug. 1995.

The Federal Transit Administration, TCRP Report 32 Multipurpose Transit Payment Media, Chapter 2 Multipurpose Fare Payment: Overview, p. 10-20.

Nora Wood, The Power of the Card, Incentive, Jul. 1997, 6 pages.

Kenneth Hein, What's the Deal?, Incentive, Jul. 1998, 7 pages.

U.S. Appl. No. 11/134,018, filed May 20, 2005, Brake.

U.S. Appl. No. 11/289,872, filed Nov. 29, 2005, Brake.

Hight, J., Strategies & Tactics: Portfolio and Risk Management Services Consulting Services Overview, Retrieved from the Internet on Oct. 15, 2002.

Hamey, K., The Washington Post: Home Asset Management Accounts Link Mortgages, Equity Lines [Final Edition], Oct. 5, 2002.

Rossman, K. "Summary Appraisal of Real Property", Feb. 15, 2002.

Stoughton, S., "The Gift of Credit" - Washington Business, Dec. 14, 1998.

Unknown, Pro Quest - Wells Fargo Blazes New Trail for Homeowners, *PRNewswire*, NY, Oct. 2, 2002.

Unknown, "Intelligent Call Router: Delivering the Right Information to the Right Resource for Every Customer Interaction," GeoTel, Best of CTI Expo - Fall 1998.

* cited by examiner

SELECTABLE MULTI-PURPOSE CARD

This application is a continuation application of U.S. Ser. No. 11/011,683, filed Dec. 15, 2004 and now issued as U.S. Pat. No. 7,191,952, which was a divisional of U.S. Ser. No. 10/436,466, filed May 13, 2003 and now issued as U.S. Pat. No. 7,163,153, which was a divisional of U.S. Ser. No. 09/730,399, filed Dec. 6, 2000 and now issued as U.S. Pat. No. 6,631,849, each of which are hereby incorporated by reference in their entireties.

FIELD OF THE INVENTION

The present invention relates generally to a financial services vehicle, such as plastic credit cards of the type commonly associated with MASTERCARD®, VISA®, AMERICAN EXPRESS®, ATM banking cards, security cards, or identification cards. More specifically, it relates to a selectable, multi-purpose card having a plurality of features stored in memory means operatively mounted on the card and selection means mounted on the card or a card reader allowing a user to select a card feature in a single step. The features when selected allow the card to function as a different card and/or to perform functions not traditionally available in financial plastic cards.

BACKGROUND OF THE INVENTION

Magnetic cards, such as commercial credit cards, debit cards, or transfer funds cards are widely used for payments, cash advances, or other financial transactions. Data for identifying the customer, such as an account number, a security code, or other identifying data is typically magnetically stored on a magnetic tape or strip embedded into the back side of the card.

When a transaction is to be performed at a retail store, a customer hands his or her card to an employee of the retail store and the employee then scans the magnetic information into a communication device.

When a credit card is utilized in a bank in order to receive a cash advance, the transaction is handled by either a teller or an automated teller machine (ATM). In the case of an ATM, the card is placed inside the ATM and the credit card owner enters a personal identification number (PIN) which is transmitted to the credit card company along with the transaction information. When the PIN number is found to be incorrect, most credit companies send to the credit card user a request to re-enter the PIN number.

Smart cards, i.e., cards having integrated circuit (IC) chips embedded into the cards are also known. A conventional smart card may include a processor coupled to an electrically erasable, programmable, read-only memory (EEPROM), read-only memory (ROM) and random access memory (RAM). These components may be fabricated onto a single integrated chip comprising a microprocessing/controller unit (MPU). The processor executes instructions stored on ROM and temporarily stores data on RAM whereas the EEPROM is a non-volatile memory used for storing data identifying the uniqueness of a smart card. A smart card also may include an input/output (I/O) signal interface for transferring various I/O signals between the smart card and an external system. The I/O interface may take the form of a contact with the external system, or a peripheral thereof, for proper transfer of signals. Alternatively, the I/O interface may take the form of a radio frequency (RF) interface for allowing communication between the smart card and the external system via the transmission and reception of RF signals. The external system may take the form, for example, of a card reader, a merchant's point of sale system, or an automated teller machine.

Typically, power is supplied to the smart card from the external system when the system communicates with the smart card. This may be accomplished through the I/O interface. However, this means that a smart card is only powered and its data is accessible only when the smart card is connected to the external system.

One of the widespread uses of smart card technology is as a stored-value card, which contains monetary value in the microchip embedded in the card. For example, each time a consumer uses a chip card in a vending machine, the amount of the purchase is deducted from the cash balance stored in the microchip on the chip card. One application for such stored-value chip cards is eliminating the need for people to carry around small coins or bills and speed up the time it takes to consummate small cash transactions. However, most chip cards do not offer built-in displays for viewing the cash balance remaining on the chip card. This reduces the convenience and ease of use of chip cards.

Some have suggested including a display to a plastic card in conjunction with input means, such as a keypad for viewing and editing information. For example, U.S. Pat. No. 4,954,985 to Yamazaki describes a smart card with a ferroelectric, liquid crystal memory region and a ferroelectric, liquid crystal display (LCD) region. U.S. Pat. No. 5,777,903 to Poisenka, et al. describes a smart card having a microprocessing unit (MPU) for executing instructions stored in a memory, a liquid crystal display (LCD), coupled to the MPU for displaying information, a keypad, coupled to the MPU and to the display for entering data by the user, an interface for transferring signals between the smart card and the external system when the smart card is coupled to the external system, and photovoltaic cells for providing power to the smart when the smart card is exposed to light.

U.S. Pat. No. 5,590,038 to Pitroda ("Pitroda") describes a card that includes an LCD display and means for selecting between various card features. The means for selecting between the various card features, described by Pitroda, are generally complex, difficult to implement and they will result in a bulky and unpractical plastic card. Moreover, LCDs such as the one suggested by Pitroda have not found wide commercial success in plastic cards. They are generally less flexible than the remainder of the plastic cards, and thus, they tend to fracture under normal use conditions. To prevent LCDs from fracturing the displays would have to be either too small or too thick. Another problem associated with multi-purpose cards, such as the card of Pitroda is that they generally require the user to follow a plurality of steps to select the desired feature. These and other problems with known plastic cards exist.

SUMMARY OF THE INVENTION

It is an object of the present invention to provide a thin, flexible, card that combines the functions of different cards into a single card instrument.

It is another object of the present invention to provide a card that includes a plurality of features and selection means that allow a user to select a desired feature preferably in a single step, prior to presenting the card to a sales person or using the card.

It is yet another object of the present invention to provide a card that may include a thin, flexible display, such as a light-emitting polymer (LEP) display for displaying information denoting the selected feature, and/or other information, or instructions relating to the selected feature. The information may be, for example, account status or recent transaction information or a graphic image such as a logo of the issuing authority.

One aspect of the present invention relates to a selectable, multi-purpose card that includes a plurality of features stored in memory means operatively mounted on the card and selection means mounted on the card for allowing a user to select a feature in only a few simple steps or preferably in a single step. In an alternative embodiment the selection means are mounted on a card reader device. The card reader may also include a display for displaying information relating to the various card features.

Preferably, the card is a thin, flexible card having substantially the same form factor as conventional plastic credit or smart cards of the type commonly associated with MASTERCARD®, VISA®, and AMERICAN EXPRESS®. Preferably, the card may be from about 80 mm to about 90 mm long, from about 50 mm to about 60 mm wide and from about 0.5 to about 1.5 mm thick.

The card can be, for example, a debit card, a credit card, a transfer funds card, a smart card, a stored-value card, a gift card, an ATM card, a security card or an identification card. The features may allow the card to function as a different card, such as a credit card, debit card, ATM bank card, stored value card, security card, identity card and the like. The card may also include means for providing or processing either account, identity, payment, health, transactional, or other information and communicating with central processing units or computers operated by the providers of services, such as credit card institutions, banks, health care providers, universities, retailers, wholesalers or other providers of goods or services employers, or membership organizations. Card features may also enable the card to communicate with or be accessed by other devices, including those used by retailers (point of sale computers), and personal computers used in other business applications or at home, for example, personal computer using a built-in or attached card reader.

A card feature may be selected by a variety of means, such as by input at the merchant point of sale, on the Internet, network, or similar virtual location, through an associated input device, or preferably by means included on the plastic card itself.

In one embodiment of the present invention, a card is provided which includes a plurality of magnetic strips, each magnetic strip containing information that allows activation of a different card feature. Preferably, the magnetic strips are positioned on the card in a manner that allows them to be read by simply swiping them in a conventional magnetic reading device such as an ATM machine or any other magnetic strip reader. However, in alternate embodiments, swiping may require a particular orientation of the card, and/or a particular depth setting of the magnetic stripe reader in order to access the appropriate feature, account, identity or other information stored on the card.

In another embodiment of the present invention a card is provided which includes a programmable magnetic strip, a plurality of features stored in memory means mounted on the card, a plurality of buttons or contacts for selecting between the features, and means for programming the magnetic strip with a different card feature. The user can select a feature by depressing or touching the buttons and or contacts which causes the programming means to program the magnetic strip with information that activates the selected feature. The user can then scan the card in a magnetic reader device. Preferably, the card of the present invention may contain a display for displaying information denoting the selected feature, or other information and instructions relating to the selected feature.

More preferably, the display may be a light-emitting polymer (LEP) display. Alternatively, a card reader may be provided comprising selection means and a display for selecting and displaying a card feature.

In yet another embodiment of the present invention, a card is provided that includes a display, preferably an LEP display, and a keypad for selecting a different card feature and/or editing information relating to the selected feature. Suitable light emitting polymeric materials include conjugated polymers such as poly (ρ-phenylene vinylene) (PPV), PPV derivatives, pyridine containing polymers and copolymers such as poly (ρ-pyridine) (PPy), poly (ρ-pyridyl vinylene) (PPyV), copolymers of PPyV and PPV derivatives (PPyVP $(R)_2V$) with various functional side groups $R=C_{12}H_{25}$, $OC_{16}H_{33}$, $COOC_{12}H_{25}$, strapped copolymer, and other conjugated polymers and copolymers.

Means also may be provided for providing storing, and recharging electric power and for selectively providing power to the components to the card. The card may also include security means for preventing unauthorized use of the card and for preventing unauthorized access to the information stored in the memory means of the card.

The present invention also relates to a method for conducting an electronic transaction comprising providing a selectable multi-purpose card and a card reader; establishing an electronic communication between the card and the card reader, selecting a card feature, and conducting an electronic transaction corresponding to the selected card feature.

Other features and advantages of the invention will become apparent from the description of preferred embodiments in conjunction with the following figures.

DETAILED DESCRIPTION OF THE PREFERRED EMBODIMENTS

Figure 1:
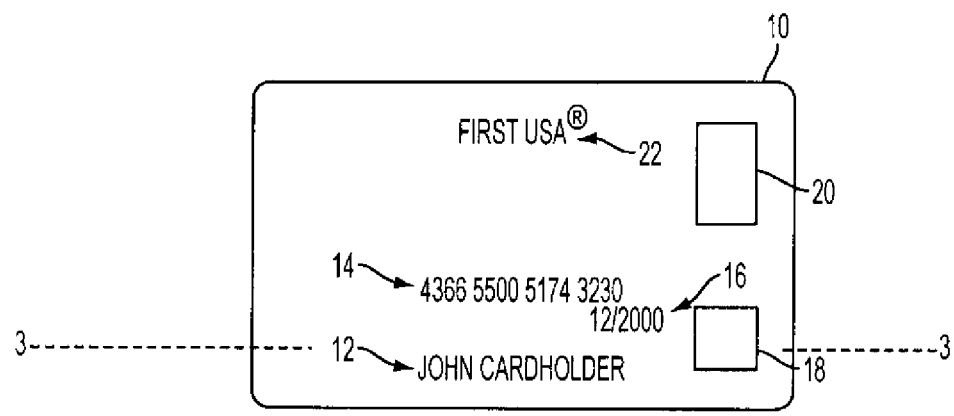
FIG. 1 is a front view of a card according to one embodiment of the present invention.
Figure 2:
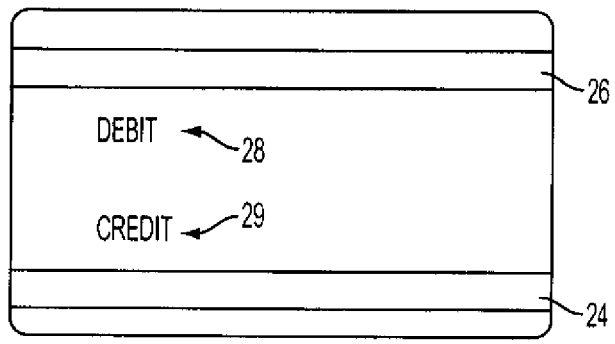
FIG. 2 is a rear view of the card of FIG. 1.

Referring to FIGS. 1 and 2, a preferred embodiment of the present invention card is provided. The front face of the card 10 has embossed letters 12 which identify the authorized user of the card 10. It further includes embossed account numbers 14 which identify the account associated with the card 10. For example, if the card is used as a credit card the account number 14 identifies the credit account from which charges are deducted when a purchase or cash advance is made.

The front face of the card 10 further may also include numbers 16 denoting the expiration date of the card, a logo 18 denoting the issuing authority such as VISA®, MASTERCARD®, AMERICAN EXPRESS®. The front face of the card 10 may further include one or more conventional design elements such as a hologram 20, and printed letters 22 denoting the financial institution issuing the card.

The rear face of the card 10 includes two magnetic strips 24 and 26. Each magnetic strip 24 is programmed with a code corresponding to a particular feature of the card and an authorization code. Embossed or printed characters 28, 29 positioned adjacent the magnetic strips 26, 24, respectively, denote the card feature that can be activated by swiping each magnetic strip. Magnetic strips 24 and 26 can be read using conventional magnetic reader devices. Magnetic strips 24 and 26 are preferably positioned in a manner that allows selection of a desired feature by simply swiping magnetic strip with the desired feature through a conventional magnetic reader device such as an ATM machine. Card 10 has width, length, and thickness dimensions similar to those of conventional plastic cards. For example, a card 10 may be about 86 mm long, about 55 mm wide, about 0.8 mm thick, and may meet other ISO Standards associated with such cards.

Figure 3A:
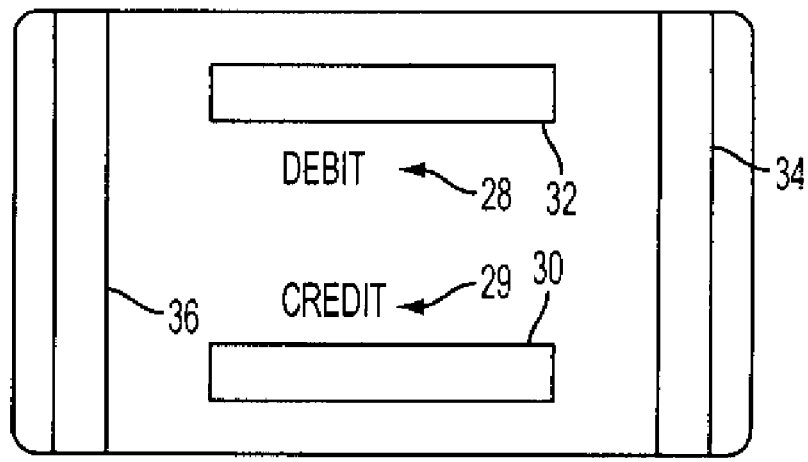
FIG. 3A is a rear view of a card according to another embodiment of the present invention.

FIG. 3A illustrates an alternative embodiment where card 10 has four magnetic strips 30, 32, 34, and 36 embedded on the rear face of card 10, which are preferably positioned sufficiently close to the edges of the card 10 to permit scanning by simply swiping conventional magnetic reader devices. However, it should be understood that the present invention is not limited to the aforementioned configuration and positioning of the magnetic strips, and that other embodiments can be envisioned by a person skilled in the art from the disclosure of the present invention. For example, the magnetic strips may be on the front or the rear face of the card.

Figure 3B:
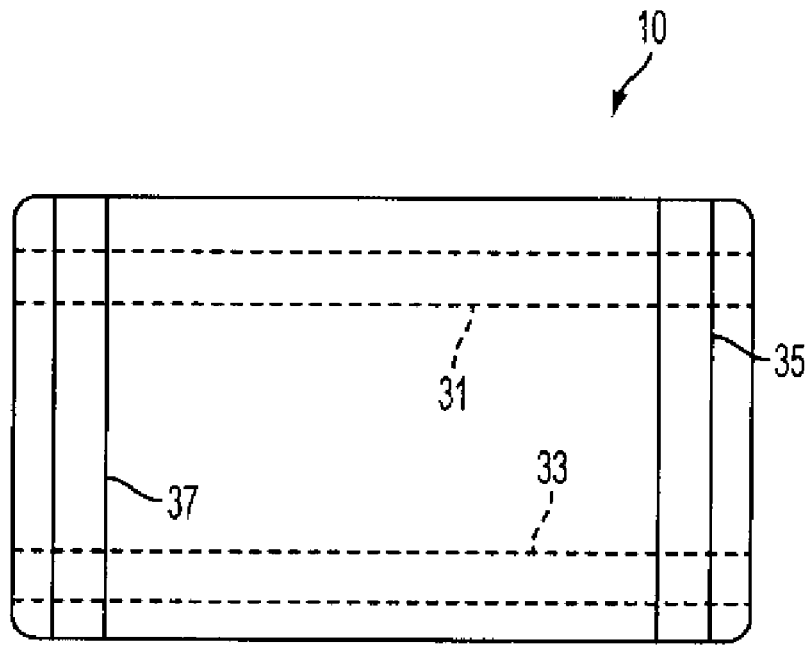
FIG. 3B is a rear view of a card according to another embodiment of the present invention.

FIG. 3B illustrates an embodiment of the present invention wherein a card has vertical magnetic strips 35 and 37 positioned on the rear face of the card and horizontal magnetic strips 31 and 33 positioned on the front face of the card. The length and width of the magnetic strips may vary. For example, the horizontal magnetic strips 31 and 33 may extend the whole length of the front face of the card as shown in FIG. 3B.

Figure 4:
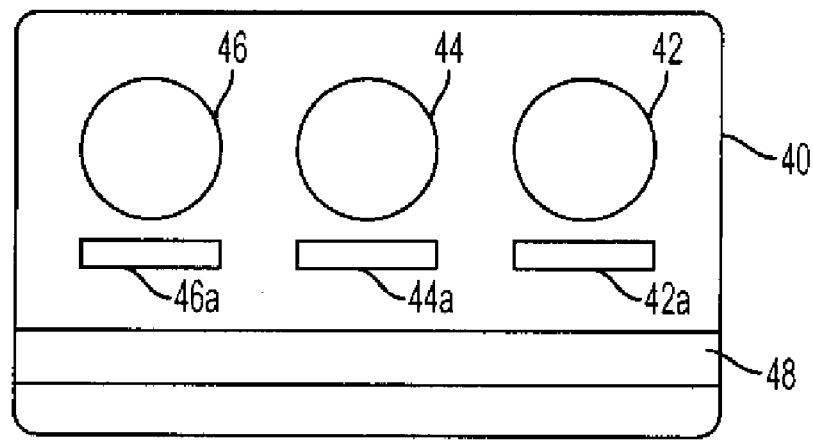
FIG. 4 is a rear view of a card according to yet another embodiment of the present invention.
Figure 5:
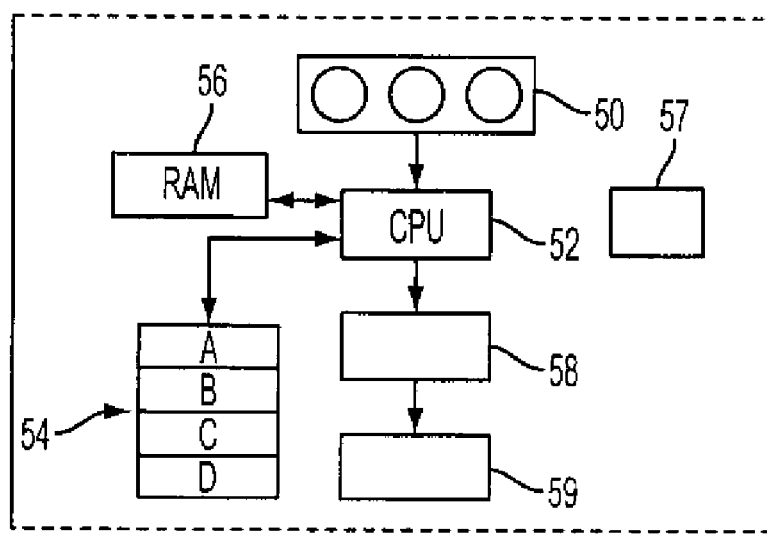
FIG. 5 is a block schematic of exemplary systems and circuits that may be employed in the card of FIG. 4.

Referring to FIGS. 4 and 5 another embodiment of the present invention is provided. FIG. 4 illustrates the rear face of a smart card 40 having a plurality of buttons 42, 44, and 46, each button activating a different card feature. For example, buttons 42, 44, and 46 may be depressible or touch sensitive buttons. Optionally, the rear face of the smart card 40 may further include characters 42a, 44a, and 46a denoting the card feature corresponding to each button 42, 44 and 46, respectively. The back face of the smart card 40 may also include a programmable magnetic strip 48. The magnetic strip is encoded with a code number or some other key corresponding to a card feature selected by the user by depressing or touching a button corresponding to that feature. To accomplish this the smart card 40 may, for example, include the systems and circuits illustrated in FIG. 5. Referring now to FIG. 5, card 40 includes a central processing unit (CPU) 52, a read-only memory (ROM) 54, dynamic memory (RAM) 56, a power supply system 57, an input control circuit 50, a magnetic strip controller 58 and an inductor 59. The power supply system 57 may be any of many well known systems such as, for example, a solar cell connected to a rechargeable battery. In operation, the CPU 52 receives power from the power supply system 57 and distributes the power to the other systems and circuits by a programmed sequence of steps which is stored in the ROM 54.

The smart card 40 may also include a display (not shown). For example, after a selection of a feature is made, a graphic image may appear on the display which looks like the face of a conventional credit card, including the account number, the user's name, the name of the credit card company and its logo. Thereafter, the user may present the card to the point of sales terminal for a sales transaction. The display is preferably a thin, flexible LEP display.

Memory 54 may be divided into a plurality of discrete portions, i.e., a common portion A containing information such as the identity of the user and a basic account number and individual discreet portions B, C and D. Each discrete portion B, C, D may contain at least a code or some other key that allows access to a specific card feature. In operation, the user may select a card feature by depressing one of the buttons 42, 44 or 46. The button controller circuit 50 is operatively connected to the CPU 52. The button controller circuit 50 detects which button is depressed and sends this information to the CPU 52. The CPU 52, in turn, uses this information to read the code and any other information stored in a discreet portion of memory 54 that corresponds to the button depressed by the user. The CPU 52 also may read the user information stored in the common portion A of memory 54, and store the code and user information in the RAM 56.

The magnetic strip 48 is then encoded with the code, user and any other information stored in the RAM 56. This encoding may be achieved by many different methods known in the art such as the one described, for example, in U.S. Pat. No. 4,868,376 to Lessin et al. which is incorporated herein by reference for all purposes to the extent that is not inconsistent with the disclosure and claims of the present invention.

For example, data to be communicated may be output from a processor and converted by magnetic strip control circuit 58. Magnetic strip control circuit 58 may output a signal that drives an inductor 59 to generate a magnetic field pattern which can be read by a card reading device. Signals representing the data to be communicated are output serially, thus emulating data encoded on a magnetic strip.

Preferably, the data is only temporarily preserved on the magnetic strip 48. After a certain predetermined period of time sufficient for completion of the transaction, for example, five minutes, the processor may supply a signal to the magnetic strip control circuit which eliminates the generation of the magnetic field, thereby decoding or erasing the magnetic strip.

In a variation of the above embodiment, instead of, or in addition to the buttons 42, 44, and 46, the plastic card may contain at least one pair of contacts which are exposed on at least one surface of the card. The contacts are designed to allow a user of the card to select a feature corresponding to the pair of contacts by bridging the exposed contacts with his finger.

In an alternative embodiment of the present invention a smart card is provided comprising a plurality of features stored in a plurality of chips operatively mounted on the card and a plurality of contact interfaces corresponding to each chip. The contact interfaces may be mounted on the front or rear face of the card for allowing a user to select a card feature separately using a smart card reader to activate a card feature via a contact interface. The contact interfaces are preferably positioned on the card to allow scanning or reading using conventional smart card readers.

In yet another embodiment, the card may include a thin, flexible, LEP display. The LEP display may cover, for example, a portion of the surface of the card or it may cover the whole surface of at least one side of the card. By selecting a feature of the card as described above, information denoting the selected feature, other information and/or instructions relating to the selected feature may appear on the display. The information may, for example, be an image, characters, numbers or any combination thereof denoting the credit card issuing authority, the credit card company and its logo. The display may be touch-sensitive, e.g., it may provide the user with a number of graphical images which enable the user to selectively chose a card feature by touching selected parts of the touch-sensitive display.

For example, a user may select a feature of the card, such as a stored-value feature. The LEP display, mounted preferably on the front side of the card (not shown), will then display the characters "STORED-VALUE" and the remaining amount in the stored value card.

In one embodiment the LEP display may comprise a semiconductor layer in the form of a thin dense polymer film comprising at least one conjugated polymer, a first electrode in contact with a first surface of the semiconductor layer and a second electrode in contact with a second surface of the semiconductor layer. The polymer film should have a sufficiently low concentration of extrinsic charge carriers so that on applying an electric potential between the first and second electrodes in a manner that renders the second electrode positive relative to the first contact layer charge carriers are injected into the semiconductor layer and light is emitted from the semiconductor layer.

In yet another embodiment, the LEP display comprises an electron transporting layer in contact with an electron blocking polymer, the electron blocking polymer incorporating a network electrode polymer. The LEP display is connected to a source of electrical current via electrodes so as to supply the electron transporting polymer with a flow of electrons, and to cause an electroluminescent emission from the heterojunction between the electron transporting polymer and the electron blocking polymer.

The electron transporting polymer may be any conductive polymeric material of appropriate conductive and electron affinity characteristics to allow it to act as the electron transporting polymer in a light emitting device. Likewise, the electron blocking polymer may be any polymeric material of appropriate electron blocking-polymer characteristics to allow it act as the electron blocking polymer in a light emitting device. The network electrode polymer may be any polymeric material that forms an electrically conducting network polymeric structure within the electron blocking polymer.

Figure 6:
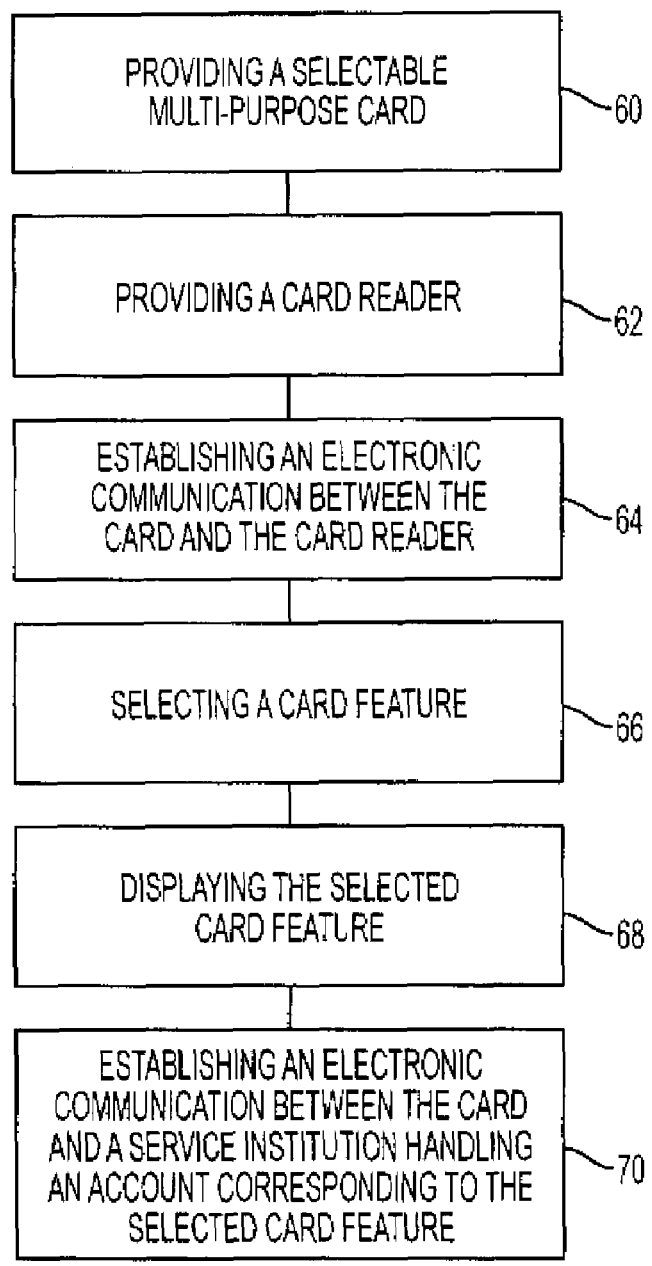
FIG. 6 is a block schematic of a preferred embodiment of the present invention method.

Referring to FIG. 6 a method for conducting an electronic transaction using the selectable multi-purpose card of the present invention is provided. The method comprises providing a selectable multi-purpose card and a card reader, according to blocks 60 and 62, respectively. The card reader may be any conventional reader having means for establishing an electronic communication between the card reader and the card, and means for establishing an electronic communication between the card and a service institution handling an account corresponding to the selected card feature. Preferably, the card reader may also include means for allowing a user to select a card feature and a display for displaying the selected card feature and/or other information relating to the selected card feature.

The method further comprises establishing an electronic communication between the card and the card reader, and selecting a card feature according to blocks 64 and 66, respectively. The selected feature may then be displayed on a display mounted either on the card or the card reader, according to block 68. The method further comprises establishing an electronic communication between the card and a service institution handling an account corresponding to the selected feature, according to block 70.

The foregoing embodiments have been presented for the purpose of illustration and description only and are not to be construed as limiting the scope of the invention in any way. The scope of the invention is to be determined from the claims appended hereto.

What is claimed is:

1. A system for conducting an electronic transactions using a transaction card, comprising:
   a multiply-readable transaction card having a plurality of different reading mechanisms for account information to be read from the card;
   the transaction card having stored account information including first stored account information readable using a first reading mechanism and second stored account information using a second reading mechanism; and
   the transaction card being readable using multiple reading mechanisms by a card reader device;
   wherein the card reader terminal device is adapted to read said first stored account information using the first mechanism and said second stored account information using the second mechanism, wherein at least one mechanism utilizes emulated magnetic stripe data produced by the card, wherein data from the account information accessed by the card reader is used to effectuate a financial transaction.

2. The system of claim 1, wherein the first mechanism is magnetic stripe reading and the second mechanism is a smart card reader contact interface.

3. The system of claim 1, wherein the first mechanism is magnetic stripe reading and the second mechanism is emulated magnetic stripe data produced by the card.

4. The system of claim 1, wherein the first mechanism is magnetic stripe reading and the second mechanism is RFID reading.

5. The system of claim 1, wherein the first mechanism is a first magnetic stripe and the second mechanism is a second, different magnetic stripe, both magnetic stripes being disposed on the same card.

6. The system of claim 1, wherein the first mechanism is magnetic stripe reading and the second mechanism is other than magnetic stripe reading.

7. The system of claim 1, wherein the first mechanism is RFID reading and the second mechanism is other than RFID reading.

8. The system of claim 1, wherein the first stored account information comprises an account number.

9. The system of claim 1, wherein the first stored account information comprises a security code.

10. The system of claim 1, wherein the first stored account information corresponds to a first financial account different from a second financial account corresponding to the second stored account information.

11. The system of claim 1, wherein a financial transaction can be effectuated by reading account information from a single reading mechanism without accessing another reading mechanism on the transaction card.

12. The system of claim 1, wherein the first stored account information readable using a first reading mechanism has data for the same financial account as for the second stored account information readable using the second reading mechanism.

13. The system of claim 1, wherein the first stored account information readable using the first reading mechanism is used to generate a security code.

14. The system of claim 1, wherein the first stored account information corresponds to a first financial account that is the same as a second financial account corresponding to the second stored account information, thereby providing a transaction card wherein the same financial account can be accessed using two different reading mechanisms.

15. The system of claim 14, wherein the first reading mechanism is magnetic stripe reading and the second mechanism is RFID reading.

16. The system of claim 1, wherein the card reader terminal device has a selector for selecting to read the first stored account information or the second stored account information.

17. The system of claim 1, wherein the transaction card has a selector for selecting which stored account information can be read.

18. The system of claim 1, wherein the transaction card has the form function of a credit card, and further wherein:
the transaction card has a flexible display for displaying information to the cardholder.

19. The system of claim 1, wherein the data is processed over a payment network.

20. The system of claim 1, wherein the transaction card stores a plurality of portions of the first stored account information that are accessed using a plurality of different access mechanisms.

21. The system of claim 20, wherein the plurality of portions of the first stored account information comprises an account number, a cardholder identity, and a feature.

22. The system of claim 21, wherein the feature permits a selection between a debit transaction and a credit transaction for the account number.

23. The system of claim 1, wherein the transaction card provides for the card to function according to at least two features from the list comprising a debit card, credit card, stored value card, ATM card, security card, and a identification card.

24. The system of claim 1, wherein the transaction card includes a processor for generating data for an account transaction for reading using a conventional magnetic stripe reader.

25. The system of claim 24, wherein the processor-generated data is temporarily stored on a magnetic stripe on the transaction card.

26. The system of claim 24, wherein the processor causes the issue of a signal to remove the processor-generated data for the account transaction from the card.

27. The system of claim 1, wherein the card is encoded with one of: a key and a code.

28. A system for conducting an electronic transactions using a transaction card, comprising:
a multiply-readable transaction card having a plurality of different reading mechanisms for account information to be read from the card;
the transaction card having stored account information including first stored account information readable using a first reading mechanism and second stored account information using a second reading mechanism; and
the transaction card being readable using multiple reading mechanisms by a card reader device;
wherein the card reader terminal device is adapted to read said first stored account information using the first mechanism and said second stored account information using the second mechanism, wherein data from the account information accessed by the card reader is used to effectuate a financial transaction; wherein the first reading mechanism is magnetic stripe reading utilizing emulated magnetic stripe data produced by the card and the second mechanism is RFID reading; and
wherein a financial transaction can be effectuated by reading account information from a single reading mechanism without accessing another reading mechanism on the transaction card.

29. A system for conducting an electronic transactions using a transaction card, comprising:
a multiply-readable transaction card having a plurality of different reading mechanisms for account information to be read from the card;
the transaction card having stored account information including first stored account information readable using a first reading mechanism and second stored account information using a second reading mechanism;
a selection device configured to:
enable a user to select any of the plurality of card features in a single step; and
cause the card to communicate card information to an external system; and
the transaction card being readable using multiple reading mechanisms by a card reader device;
wherein the card reader terminal device is adapted to read said first stored account information using the first mechanism and said second stored account information using the second mechanism, wherein at least one of the plurality of different reading mechanisms is RFID reading, wherein data from the account information accessed by the card reader is used to effectuate a financial transaction.

30. The system of claim 29, wherein the card is encoded with one of: a key and a code.

* * * * *